Aug. 18, 1959     H. J. BURNETT     2,900,039
PICK-UP DEVICE
Filed July 3, 1953
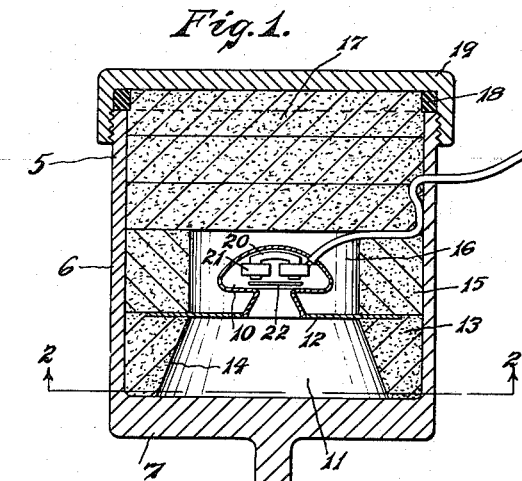
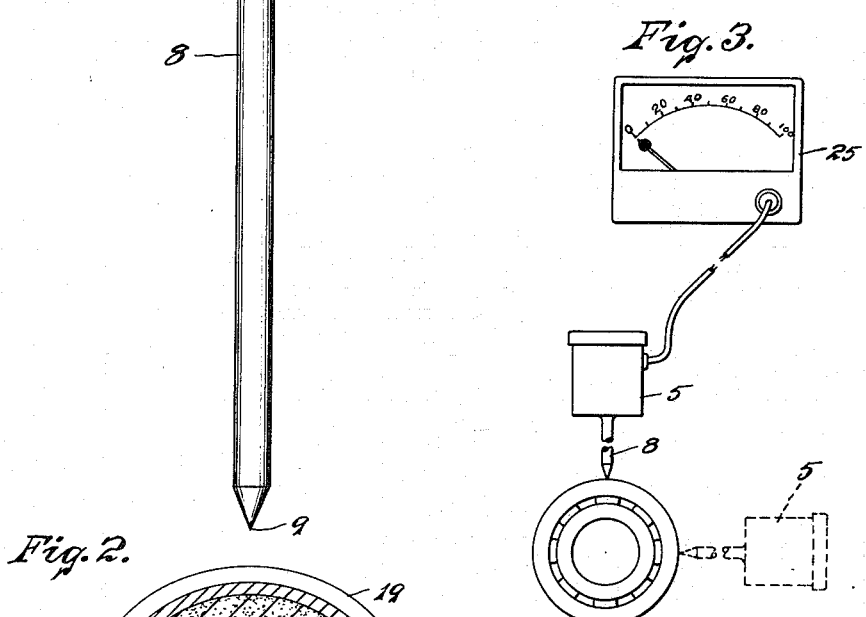
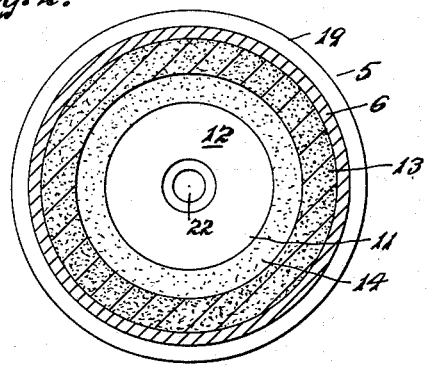
INVENTOR.
HENRY J. BURNETT.
BY
Louis V. Lucia
ATTORNEY.

United States Patent Office 2,900,039
Patented Aug. 18, 1959

2,900,039

PICK-UP DEVICE

Henry J. Burnett, West Hartford, Conn.

Application July 3, 1953, Serial No. 365,979

8 Claims. (Cl. 181—24)

This invention relates to a pick-up device and more particularly to a device for use in finding the source of energy converted into a form of noise.

The pick-up device provided by this invention is especially adapted for detecting energy loss in bearings of machines and the like due to physical movement between parts which produces vibration or friction that causes a loss of energy when converted into noise.

Heretofore, pick up devices of various kinds have been used for detecting noise in bearings and the like, but such devices have been found inaccurate for the reason that they responded to physical vibration of the entire mechanism being tested and other unwanted vibrations, such as air-borne noises, which confused the signal obtained by such devices and rendered it inaccurate and unreliable for determining the cause of the loss of energy which produced the detected vibrations.

An object of the present invention, therefore, is to provide a pick-up device which will detect only the noises resulting from the lost energy due to defects or inaccuracies in the machine bearings or other moving parts thereof, and which will cancel out all physical vibration and air-borne noises.

A further object of this invention is the provision of a pick-up device which may be used with suitable means, such as an electronic device, for amplifying the picked-up signals to facilitate the accurate analysis thereof to determine the cause of the loss of energy.

A further object is to provide an improved pick-up device which is unaffected by variations in the pressure with which it is applied in the making of a test.

Further objects and advantages of this invention will be more clearly understood from the following description and the accompanying drawing in which:

Fig. 1 is a side view, partly in central vertical section, of a pick-up device embodying the present invention.

Fig. 2 is a sectional plan view thereof on line 2—2 of Fig. 1.

Fig. 3 is a diagrammatic view illustrating the method of testing a bearing with the use of my improved pick-up.

In the embodiment of the invention shown in the drawings, my improved pick-up device preferably includes a cup-shaped body 5 having a cylindrical side wall 6 and a flat end wall 7; the said end wall being of a substantial thickness for the purpose to be hereinafter described. An axial probing stem 8, which terminates in a point 9, is formed integrally with the end wall 7 or may be rigidly secured thereto.

Within the body 5 there is contained a suitable electronic transmitter 10 which is spaced from the end wall 7 by a transmitting chamber 11. The said transmitter is contained within a casing that is mounted upon a suitable disc-shaped shock absorbing member 12 that has an axial hole therein and rests upon a circular washer 13 that is constructed of shock and sound-absorbing material, such as felt or the like, and has an inner wall 14 that is preferably tapered inwardly in the direction of the transmitter to provide a cone-shaped formation for the transmitting chamber 11 which converges said chamber to funnel noise vibrations therein to the transmitter through the axial hole in the member 12. The said casing has a funnel-shaped entrance, as shown, which funnels the noise vibrations from said axial hole directly to the transmitter so that all of said vibrations are delivered directly from the transmission chamber into the transmitter.

A second felt washer 15 rests upon the washer 13 to retain the member 12 in position and the said member is spaced from the wall 6 by the said washers in order to prevent direct contact between the member and wall.

The inner wall of the washer 15 provides an inner chamber 16 which is separated from the transmission chamber 11 by the member 12 and in which the transmitter is contained. The upper portion of the cup-shaped body is packed with felt, preferably in the form of discs 17, to retain the bottom washers 13 and 15 in position and also to insulate the chambers 11 and 16 from any air-borne noises that might otherwise enter the said chambers.

Upon the upper edge of the wall 6, there is provided a suitable sealing washer 18 which is preferably of a flexible material, such as rubber, and a cover 19 which is threaded to the said wall and engages with the said sealing washer.

The transmitter of the illustrated embodiment preferably includes a permanent magnet 20 having thereon coils 21 to provide a magnetic field and a diaphragm 22, which is disposed parallel to the end wall 7, is provided for fluctuating the said field and thereby creating impulses which are transmitted through conductors in a cord 23 and a suitable jack 24 for connecting the pick-up to a suitable amplifier, such as indicated at 25 in Fig. 3, which may be of the audible and/or visual type having a suitable scale and a pointer cooperating therewith for indicating the intensity of the signal or noise energy transmitted through the pick-up.

When my improved pick-up device is connected to a suitable amplifying device, it may be used as follows:

The bearing or other parts of the machine to be tested is put under motion by rotating the spindle at its normal operating speed. The point 9 of the pick-up is then pressed against the top of the bearing and the stem 8 is held substantially in line with the vertical axis of the bearing as shown in Fig. 3. The noise energy lost in the bearing through any inaccuracies that may exist therein is then picked up by the stem and transmitted to the bottom 7. This end wall is sufficiently rigid to render it unresponsive to all unwanted physical vibration, air-borne noises and variations in pressures so that the said end wall will transmit into the chamber 11 only those vibrations resulting from the actual lost energy and which are transmitted through the stem 8 in the form of compressions and rarefactions of the material in the stem. The said vibrations are then transmitted across the transmitting chamber 11 and into the transmitter 10 wherein they will fluctuate the diaphragm 22 and cause fluctuations of the magnetic field which will in turn induce a voltage in the coils 21 that is conducted through the cord 23 into the amplifier 25. The noise energy lost in the bearing will then be indicated on the scale of the amplifier and the condition of the bearing may be readily determined by the said reading and the action of the needle. Additional tests of the bearing may be made by holding the pick-up device on the horizontal axis of the bearing as shown in dotted lines in Fig. 3 to determine the condition thereof in that direction and if the two readings are not equal, it will indicate dynamic eccentricity in the bearing under test. The plane of such eccentricity may be determined by plotting around the bearing with the pick-up device at different angles radially thereto.

It will be understood from the above description that, due to the substantial thickness of the end wall 7, the said end wall will transmit into the chamber 11 only the noise energy that is actually generated in the bearing itself and transmitted through the stem 8. The air-borne noises will not be able to enter into the chamber 11 due to the rigidity of the end wall 7 and the insulation which backs the surrounding side and top walls of said chamber. The noise energy losses which are transmitted through the end wall 7 will be transmitted across the transmitting chamber 11 and into the transmitter 10.

If desired, the interior of the cup-shaped body 5 may be put under compression by tightening the cover 19 and squeezing the flexible sealing ring 18. This will provide compression of the air within the transmitting chamber 11 and the transmitter 10 which will materially increase the efficiency of the said air in transmitting the picked-up noise energy to the diaphragm 22. This feature may be used for adjusting the output of the pick-up device to the amplifier and is particularly invaluable because it provides for varying the air pressure within the pick-up device to compensate for variations in atmospheric pressure and thereby obtaining maximum efficiency from said device under such conditions as encountered when used for testing aircraft engines at high altitudes.

I claim:

1. A pick-up device of the character described including a cup-shaped body portion having a surrounding wall, an end wall, an axial stem extending from said end wall, said end wall being of substantial thickness to prevent transmission therethrough of air-borne noises and noise energy other than that picked up through the stem, a transmitting chamber within said body portion and directly adjacent to the inner surface of said end wall, means for insulating said transmitting chamber against exterior noises not transmitted through said end wall, an electrical transmitting device contained within a separate chamber adjacent to said transmitting chamber and including means responsive to noise vibrations transmitted across said transmitting chamber from said end wall to said transmitting device for causing flow of electric current, and conductors connected to said transmitting device for conducting said current to an electric amplifier.

2. A pick-up device including a body portion having a surrounding side wall, an end wall, a cover and a probing stem extending from said end wall, the said body having therein a transmitting chamber directly adjoining said end wall and an inner chamber adjacent to said transmitting chamber, vibration insulating means between said inner and transmitting chambers and the side wall and cover of said body portion, a disc-shaped member separating said transmission chamber from the inner chamber and having an opening therethrough, the said disc-shaped member being spaced from the side walls of said body portion, and an electrical transmitting device in said inner chamber in communication with said transmitting chamber through said opening in the disc-shaped member.

3. A pick-up device including a body portion having a surrounding side wall, an end wall, a cover, a probing stem extending from said end wall, the said body portion having therein a transmitting chamber in direct communication with said end wall and an inner chamber adjacent to said transmitting chamber opposite said end wall, the side walls of said transmitting and inner chambers and the top wall of said inner chamber being entirely backed with vibration insulating material contained within the said body portion and separating said chambers from the side walls and cover of said body portion, a disc-shaped member between said transmitting and inner chambers and spaced from the side walls of said body member, the said disc-shaped member having an axial opening therein, and an electric transmitting device contained within said inner chamber and mounted upon said disc-shaped member over said opening and in communication with said transmitting chamber through said opening.

4. A pick-up device including a body portion having a surrounding side wall, an end wall, a cover, a probing stem extending from said end wall, the said body portion having a chamber therein directly adjoining said end wall, vibration insulating means between said chamber and said side walls and cover of the body portion, a disc-shaped member spaced from the side walls of said body portion and disposed across said chamber and thereby defining a transmitting chamber exposed to said end wall and an inner chamber next to said transmitting chamber, and an electrical transmitting device in said inner chamber mounted upon said disc-shaped member and in direct communication with said transmitting chamber through an opening in said disc-shaped member.

5. A pick-up device including a body portion having a surrounding side wall, an end wall, a cover, a probing stem extending from said end wall, said body portion having therein a transmitting chamber, an inner chamber adjacent to said transmitting chamber, the side walls of said transmitting and inner chambers and the top wall of said inner chamber being backed with a vibration insulating material contained within said body portion and separating said chambers from the side walls and cover of said body portion, a disc-shaped member spaced from the side walls of said body portion and separating said transmitting chamber from said inner chamber, a transmitting device contained within said inner chamber, and a passage communicating said transmission chamber with said transmission device through an opening in said disc-shaped member; the walls of said transmission chamber and passage converging towards said transmission device for funnelling noise vibration from said end wall to said transmission device.

6. A pick-up device of the character described including a body portion having an end wall of substantial thickness with a probe extending therefrom and a transmitting chamber adjacent to said end wall, a supporting disc-shaped member disposed across said transmitting chamber and defining an inner chamber spaced from said end wall, and a transmitting device contained within said inner chamber, said transmitting device being enclosed within a casing mounted upon said supporting disc-shaped member over an axial opening therein and said casing having a passage communicating said transmitting device with said transmitting chamber through said opening.

7. A pick-up device including a cup-shaped body portion having a cylindrical wall, an end wall, an axial probing stem extending from said end wall, said body portion having a chamber therein exposed to said end wall and insulated against noise vibrations from said side walls and cover, a transmitting device contained within said chamber, said transmitting device being spaced from said end wall and adapted to receive noise energy therefrom, and means for varying the air pressure within said chamber to conform with changes in atmospheric pressure and thereby increase the efficiency of said chamber for transmitting noise energy from said end wall to the transmitting device.

8. A pick-up device including a cup-shaped body portion having a cylindrical wall, an end wall, an axial probing stem directly connected to said end wall and extending therefrom, a spacing ring of vibration insulating material contained within said cup-shaped body and located upon the said end wall, a disc-shaped member mounted upon said ring and spaced from the surrounding wall of the body, the interior wall of said ring forming a transmitting chamber within said body, an electrical transmitting device mounted upon said disc-shaped member and in communication with the transmitting chamber, a second ring of vibration insulating material located upon the first ring and securing the said disc-shaped member and transmitting device in position thereon; the interior of the second ring forming a chamber containing the electrical transmitting device, a layer of insulating material over the said rings and closing the chamber over the second ring, a cover threaded to the surrounding wall, and a flexible sealing ring between the cover and the body portion, the said cover being adapted to be threaded onto the body portion sufficiently to compress the flexible sealing ring and provide an increase in air pressure within the cup-shaped member and said transmitting chamber to increase the efficiency of said chamber for transmitting noise energy from the end wall to the transmitting device, the said end wall being of substantial thickness to prevent the transmission therethrough of exterior noises other than those transmitted through the stem.

References Cited in the file of this patent

UNITED STATES PATENTS

| | | |
|---|---|---|
| 749,854 | Fahrney | Jan. 19, 1904 |
| 1,220,501 | Dean | Mar. 27, 1917 |
| 1,686,138 | Marvel | Oct. 2, 1928 |
| 1,730,531 | Robbins | Oct. 8, 1929 |
| 1,744,800 | Rayder | Jan. 28, 1930 |
| 1,746,171 | Vatinet | Feb. 4, 1930 |
| 1,761,100 | Baldwin | June 3, 1930 |
| 1,830,237 | Morse | Nov. 3, 1931 |
| 2,169,806 | Lian | Aug. 15, 1939 |
| 2,345,996 | Anderson et al. | Apr. 4, 1944 |
| 2,790,032 | Beer | Apr. 23, 1957 |

FOREIGN PATENTS

| | | |
|---|---|---|
| 473,636 | England | Oct. 18, 1937 |
| 1,021,172 | France | Nov. 26, 1952 |